(12) United States Patent
Takahashi et al.

(10) Patent No.: US 8,648,934 B2
(45) Date of Patent: Feb. 11, 2014

(54) IMAGE PROCESSING APPARATUS, IMAGE PROCESSING METHOD AND SCHEDULING APPARATUS

(75) Inventors: Ryohei Takahashi, Yokohama (JP); Nobuhiko Ando, Yokohama (JP)

(73) Assignee: Fujitsu Semiconductor Limited, Yokohama (JP)

( * ) Notice: Subject to any disclaimer, the term of this patent is extended or adjusted under 35 U.S.C. 154(b) by 335 days.

(21) Appl. No.: 13/152,983

(22) Filed: Jun. 3, 2011

(65) Prior Publication Data

US 2012/0200741 A1   Aug. 9, 2012

(30) Foreign Application Priority Data

Aug. 30, 2010  (JP) .................................. 2010-192791

(51) Int. Cl.
*H04N 5/76* (2006.01)
*H04N 3/14* (2006.01)
*H04N 5/335* (2011.01)

(52) U.S. Cl.
USPC ..................... 348/231.99; 348/294; 348/296

(58) Field of Classification Search
USPC ..................................... 348/231.99, 294–324
See application file for complete search history.

(56) References Cited

U.S. PATENT DOCUMENTS

| | | | |
|---|---|---|---|
| 5,895,498 | A | 4/1999 | Ueno et al. |
| 7,180,519 | B2 | 2/2007 | Sekiguchi et al. |
| 8,018,512 | B2 * | 9/2011 | Ito ................................. 348/296 |
| 8,184,172 | B2 * | 5/2012 | Nakaseko .................. 348/220.1 |
| 8,300,109 | B2 * | 10/2012 | Uchida ....................... 348/220.1 |
| 8,390,710 | B2 * | 3/2013 | Shigeta et al. ................ 348/296 |
| 2002/0015445 | A1 | 2/2002 | Hashimoto |
| 2007/0047807 | A1 | 3/2007 | Okada |
| 2008/0031329 | A1 | 2/2008 | Iwata et al. |
| 2009/0021621 | A1 * | 1/2009 | Hashimoto et al. ............ 348/300 |
| 2009/0160947 | A1 * | 6/2009 | Shigeta et al. ........... 348/207.99 |

FOREIGN PATENT DOCUMENTS

| | | |
|---|---|---|
| CN | 1448843 A | 10/2003 |
| CN | 1925545 A | 3/2007 |
| JP | 9-212360 A | 8/1997 |
| JP | 11-161776 A | 6/1999 |
| JP | 2001-275116 A | 10/2001 |
| JP | 2006-267663 A | 10/2006 |
| JP | 2008-42571 A | 2/2008 |

OTHER PUBLICATIONS

Chinese Office Action and Search Report Issue in the Chinese Patent Application No. 201110180182.1 dated Oct. 22, 2013.

* cited by examiner

*Primary Examiner* — Timothy J Henn
*Assistant Examiner* — Pritham Prabhakher
(74) *Attorney, Agent, or Firm* — Arent Fox LLP

(57) ABSTRACT

An image processing apparatus for performing image processing to image data, including: an image computing unit which performs to the image data the image processing including a matrix process performing a computation by using a pixel value of a plurality of pixels represented in a first direction and a second direction intersecting the first direction; a scheduling unit which calculates a number of wait pixels between first image frame and second image frame in the image data based on a size of the plurality of pixels and a presence or absence of an edge process of performing the matrix process using a copied pixel value; and an image data input control unit which outputs the image data of the first image frame to the image computing unit, delays an output of the image data of the second image frame by the number of wait pixels, and outputs the image data of the second image frame to the image computing unit.

13 Claims, 18 Drawing Sheets

FIG. 5

| ADDRESS | DATA |
|---|---|
| 0001 | MATRIX SIZE VALUE |
| 0002 | PRESENCE OR ABSENCE OF EDGE PROCESS |
| 0003 | SMOOTHING COEFFICIENT |
| 0004 | COLOR CORRECTION COEFFICIENT |
| ... | ... |

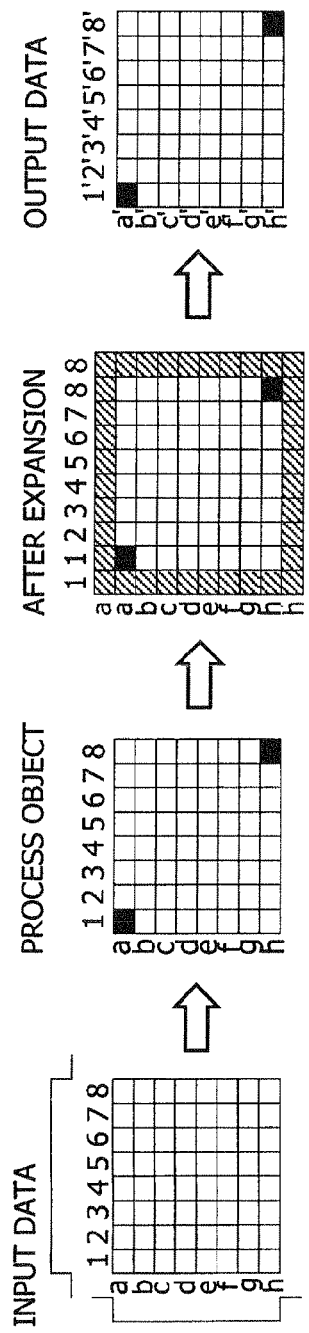
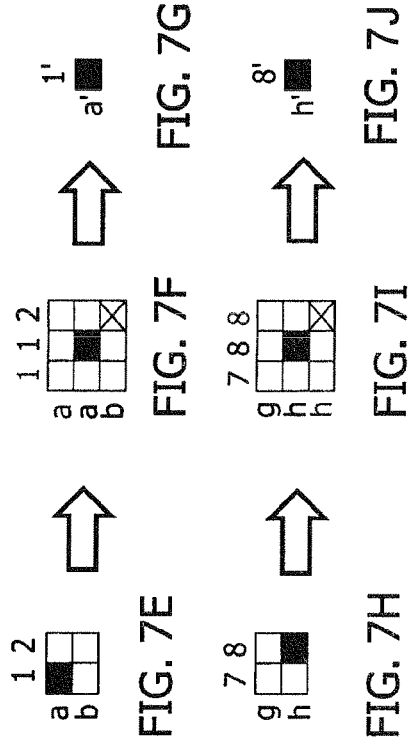

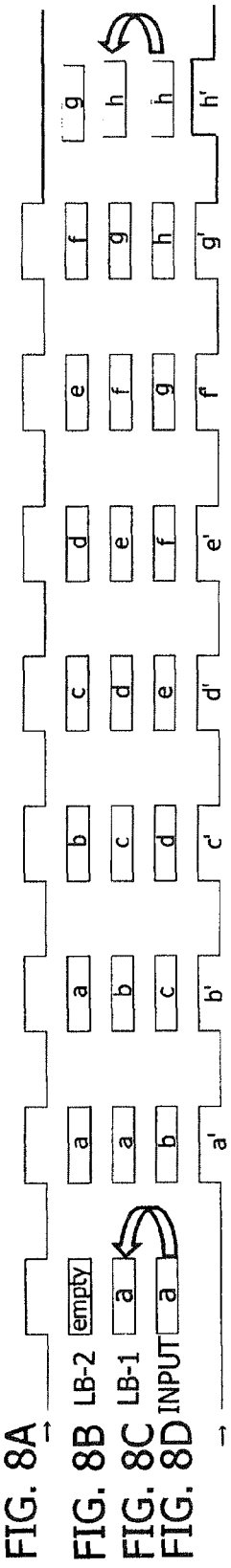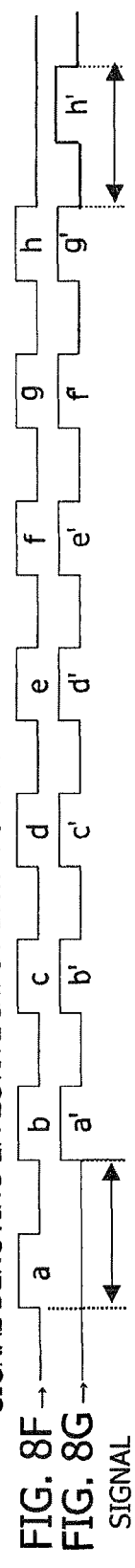

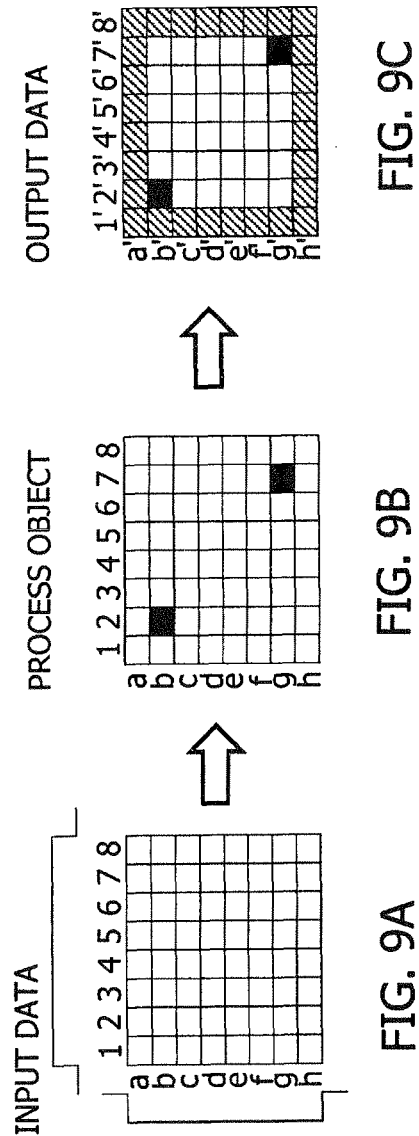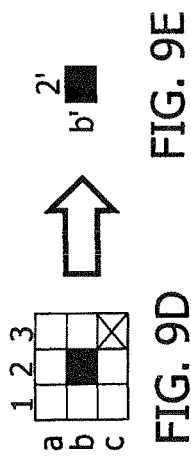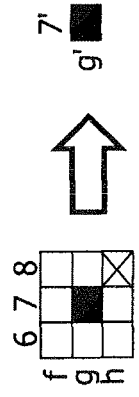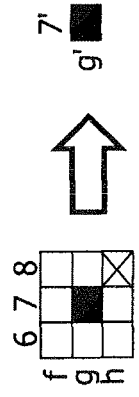

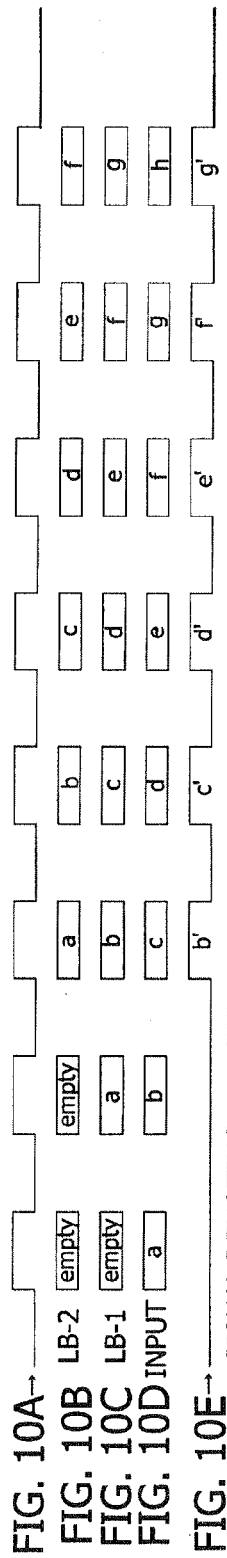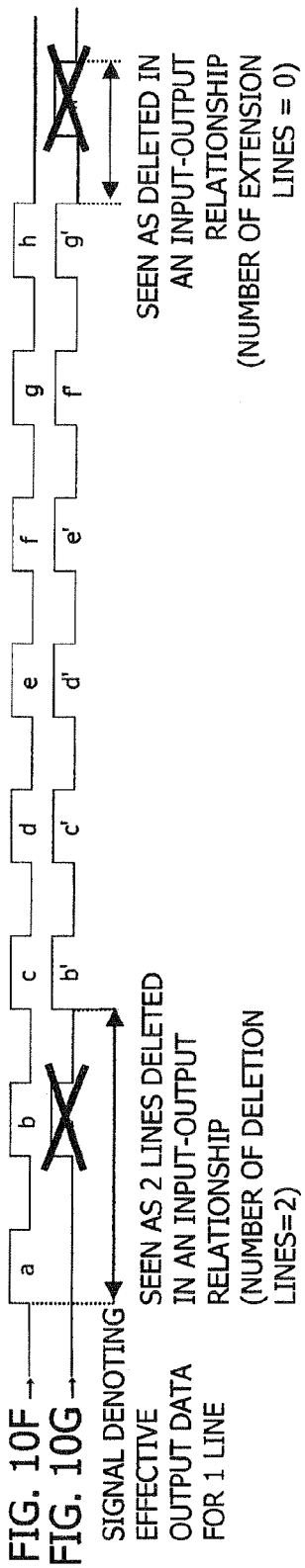

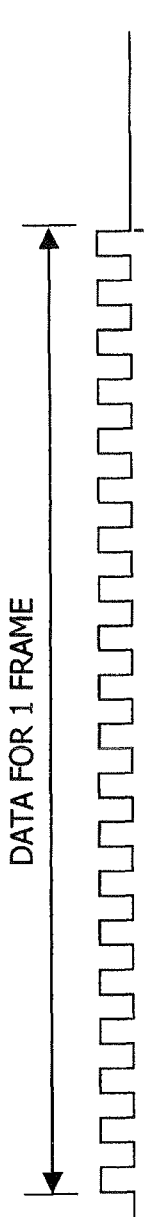
FIG. 11A
SIGNAL DENOTING
EFFECTIVE INPUT
DATA FOR 1 LINE →
FIG. 11B
SIGNAL DENOTING
EFFECTIVE OUTPUT
DATA FOR 1 LINE →
FIG. 11C
SIGNAL DENOTING
EFFECTIVE INPUT
DATA FOR 1 LINE →
FIG. 11D
SIGNAL DENOTING
EFFECTIVE OUTPUT
DATA FOR 1 LINE →

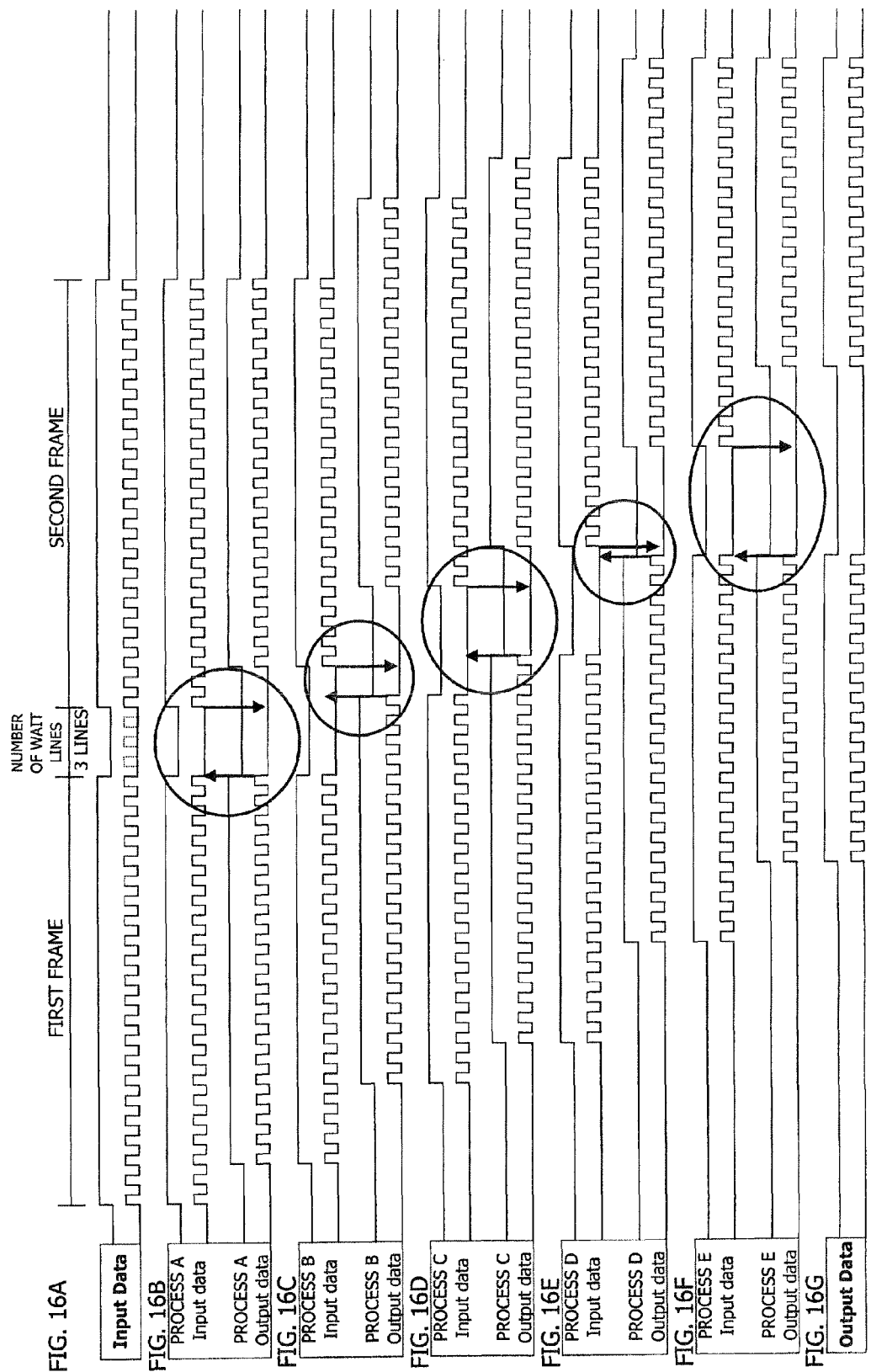

IMAGE PROCESSING APPARATUS, IMAGE PROCESSING METHOD AND SCHEDULING APPARATUS

CROSS-REFERENCE TO RELATED APPLICATION

This application is based upon and claims the benefit of priority of the prior Japanese Patent Application No. 2010-192791, filed on Aug. 30, 2010, the entire contents of which are incorporated herein by reference.

FIELD

The embodiments discussed herein are related to an image processing apparatus, an image processing method and a scheduling apparatus.

BACKGROUND

Image processing apparatuses such as digital cameras and camera-equipped mobile telephones perform various types of image processing on image data, and the resulting image data is displayed on a display unit, or is outputted to the exterior.

Examples of image processing in an image processing apparatus include, for instance, reading image data from a memory, performing image processing, and storing the result again in the memory. To process a plurality of pixels in, for example, an instance of image processing such as a color correction process, the pixel values of a plurality of pixels stored in a memory are read out, are subjected to a correction process, and are stored again in the memory.

In a case where image processing using such a memory involves, for instance, sequential input of image frames, consistency in the sequence of image frames is not maintained by storing, in a memory, image data of a next frame, before reading image data of a previous frame that is stored in the memory.

In a case where, for instance, a plurality of image processes are carried out in a sequential pipe line, image data is read from the memory in order to carry out a next image process, before image data that has been processed is stored in the memory. Consistency in the image processing order is not maintained thereby.

If consistency in the order of image frames or the order of image processes is not maintained, there are instances where image data that is outputted after a final image process is abnormal, and thus consistency of the image data itself is not preserved.

Techniques for maintaining consistency in image data include, for instance, those disclosed in Japanese Laid-open Patent Publication No. 11-161776. For example, data coordinates are outputted to a checking unit in order to determine whether data having a coordinate identical to that of data to be processed is or not in a current process, and the operation of a pipeline processing unit is discontinued if the checking unit determines that the data coordinates inputted by the pipeline processing unit are in a current process.

However, the above-described determination technique that uses data coordinates involves determining whether or not data is in a current process for all the coordinate positions of the data. Accordingly, for instance, all the pixels in the inputted image data are monitored. In such a case, input of image data of a plurality frames involves determination for all the pixels of all the frames. The above-described technique, thus, incurs very substantial processing time and power consumption.

SUMMARY

Accordingly to an aspect of the invention, an image processing apparatus for performing image processing to image data, including: an image computing unit which performs to the image data the image processing including a matrix process performing a computation by using a pixel value of a plurality of pixels represented in a first direction and a second direction intersecting the first direction; a scheduling unit which calculates a number of wait pixels between first image frame and second image frame in the image data based on a size of the plurality of pixels and a presence or absence of an edge process of performing the matrix process using a copied pixel value; and an image data input control unit which outputs the image data of the first image frame to the image computing unit, delays an output of the image data of the second image frame by the number of wait pixels, and outputs the image data of the second image frame to the image computing unit.

The invention succeeds in providing an image processing apparatus, an image processing method and a scheduling apparatus in which image data consistency is maintained. Likewise, the invention succeeds in providing an image processing apparatus, an image processing method and a scheduling apparatus in which processing time and power consumption are improved.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF THE DRAWINGS

FIG. 5 is a diagram illustrating examples of commands;

FIG. 7A to FIG. 7I are diagrams illustrating an example of a matrix process with an edge process;

FIG. 8A to FIG. 8G are diagrams illustrating examples of waveforms in a matrix process with an edge process;

FIG. 9A to FIG. 9G are diagrams illustrating examples of a matrix process without an edge process;

FIG. 10A to FIG. 10G are diagrams illustrating examples of waveforms in a matrix process without an edge process;

FIG. 11A to FIG. 11D are diagrams illustrating examples of waveforms in another matrix process;

FIG. 16A to FIG. 16G are diagrams illustrating examples of waveforms in image processing blocks;

DESCRIPTION OF EMBODIMENTS

Below, embodiments for carrying out the present invention are explained.

Figure 1A:
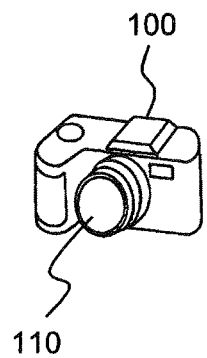
FIG. 1A is a diagram illustrating an example of an outer appearance diagram of a digital camera, and FIG. 1B of a camera-equipped mobile phone.
Figure 1B:
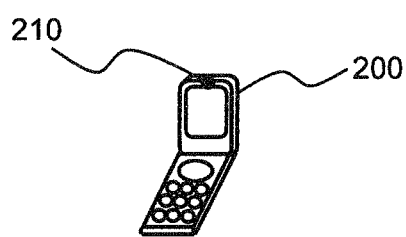

FIG. 1A and FIG. 1B are outer appearance diagrams illustrating an example of an image processing apparatus. FIG. 1A illustrates an example of a digital camera 100, and FIG. 1B illustrates an example of a camera-equipped mobile phone 200. The digital camera 100 and the camera-equipped mobile phone 200 comprise each an imaging unit 110, 210. The imaging units 110, 210 capture images and generate image data. The digital camera 100 and the camera-equipped mobile phone 200 can perform image processing on the image data generated by the imaging unit 110, 210. In the present embodiment an example will be explained in which the image processing apparatus is the digital camera 100.

(Configuration Example of an Image Processing Apparatus)

Figure 2:
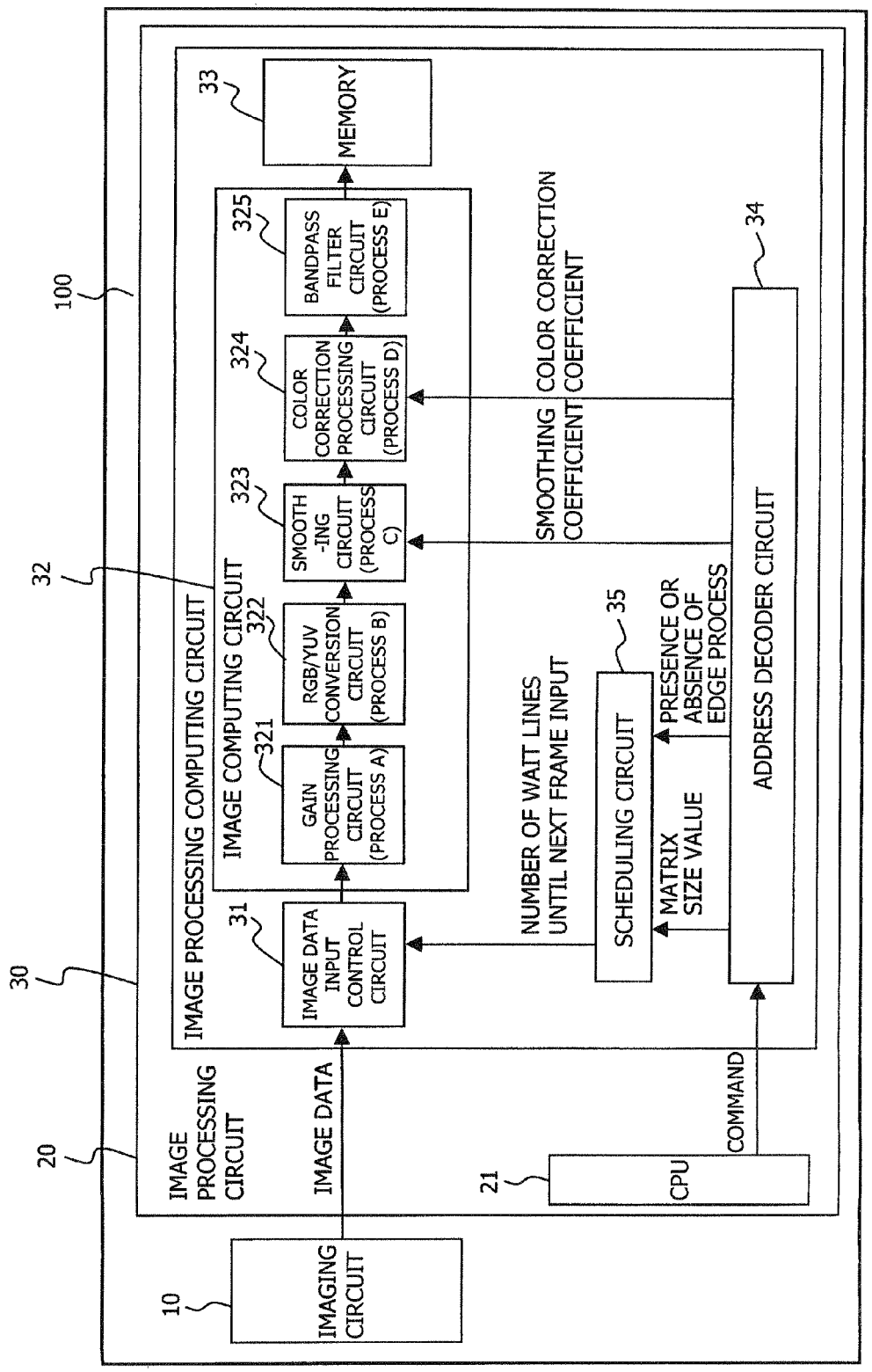
FIG. 2 is a diagram illustrating a configuration example of a digital camera.

FIG. 2 is a diagram illustrating a configuration example of the digital camera 100, as an example of an image processing apparatus. The digital camera 100 comprises an imaging circuit 10 and an image processing circuit 20.

The imaging circuit 10 (or imaging unit 110) is an imaging element, for instance a CCD (Charge Coupled Device), or a CMOS (Complementary Metal Oxide Semiconductor), that outputs a captured image in the form of image data.

The image processing circuit 20 performs, for instance, various types of image processing on the image data. The image processing circuit 20 comprises a CPU 21 and an image processing computing circuit 30. The image processing computing circuit 30 comprises an image data input control circuit 31, an image computing circuit 32, a memory 33, an address decoder circuit 34 and a scheduling circuit 35.

After power-on, for instance, the CPU (Central Processing unit) 21 outputs various commands to the address decoder circuit 34. The various commands are explained below.

The image data input control circuit (or image data input control unit) 31 receives the input of image data outputted by the imaging circuit 10, and outputs image data of a next frame on the basis of a "number of wait lines until next frame input" (hereafter, number of wait lines) that is outputted by the scheduling circuit 35. For instance, the number of wait lines may be the number of pixels for a number of wait lines, in which case the number of wait lines is the "number of wait pixels" for the number of pixels comprised in a wait line.

Figure 3:
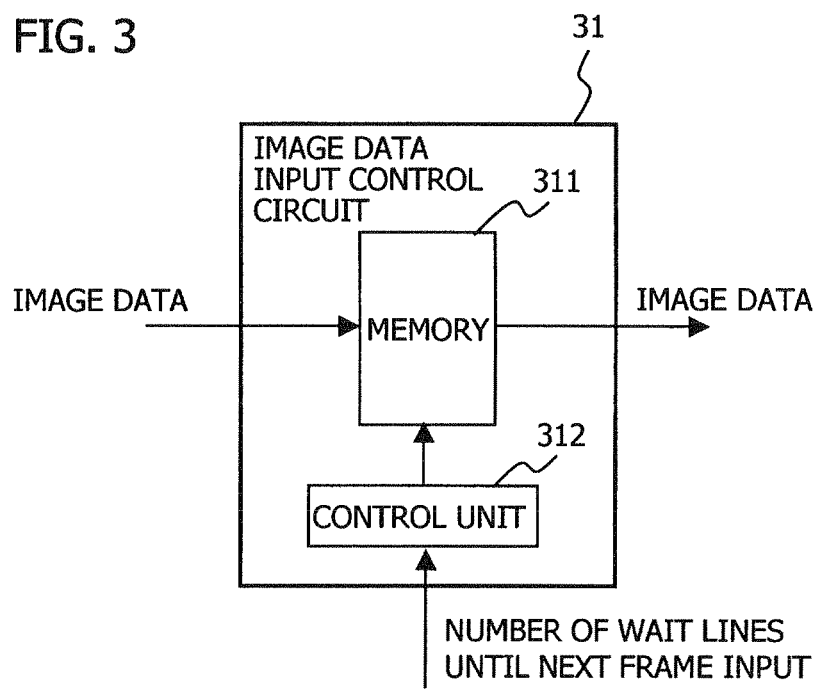
FIG. 3 is a diagram illustrating a configuration example of an image data input control circuit.

FIG. 3 is a diagram illustrating a configuration example of the image data input control circuit 31. The image data input control circuit 31 comprises a memory 311 and a control unit 312.

The memory 311 stores image data outputted by the imaging circuit 10, and outputs, to the image computing circuit 32, image data that is stored on account of control by the control unit 312.

For instance, the control unit 312 controls the memory 311 in such a manner that after output of a last line of a previous frame from the memory 311, image data of a leading line of the next frame stored in the memory 311 is outputted delayed by a number of lines corresponding to the number of wait lines (or after a time corresponding to the number of wait lines has elapsed). This operation is explained in detail further on.

Returning to FIG. 2, the image computing circuit (image computing unit, image computing apparatus) 32 is a circuit for carrying out various types of image processing on the image data. In the example of FIG. 2, the image computing circuit 32 comprises a gain processing circuit 321, a RGB/YUV conversion circuit 322, a smoothing circuit 323, a color correction processing circuit 324 and a bandpass filter circuit 325.

The gain processing circuit 321 is, for instance, an amplifier, that increases the pixel value of the input image data to a given value or higher, to maintain thereby a given pixel value (or gradation value) of the image data to be outputted. For instance, image data of images captured by the digital camera 100 in dark locations have a pixel value that is equal to or lower than a given value. Therefore, the gain processing circuit 321 allows obtaining image data having a pixel value not lower than the given pixel value.

The RGB/YUV conversion circuit 322 performs color conversion of RGB image data to YUV image data, after the gain process. The RGB/YUV conversion circuit 322, for instance, supports formulas for conversion, such that color conversion to YUV image data is accomplished by applying the formulas to the inputted RGB image data. For instance, image data can be displayed on a display unit (not illustrated) through conversion to YUV image data.

The smoothing circuit 323 averages or removes pixel values that are significantly dissimilar from pixel values of other pixels, by multiplying the pixel value of pixels around a pixel of interest, after color conversion, by a coefficient (for instance, a smoothing coefficient), or by a given formula.

The color correction processing circuit 324, for instance, adjusts the hue of the captured image by raising or lowering the pixel value of each neighboring pixel of the pixel of interest, using a formula or various coefficients (for instance, color correction coefficients) supported by the color correction processing circuit 324.

The bandpass filter circuit 325, which is made up of, for instance a resistor and/or a coil, lets image data of a specific wavelength band to pass, from among color-corrected image data, to allow thereby displaying an image that a user can see more easily.

Figure 4A:
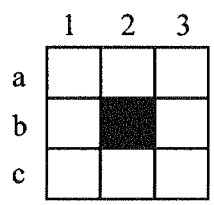
FIG. 4A and FIG. 4B are diagrams illustrating an example of a matrix process.
Figure 4B:
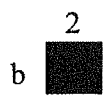

In the present embodiment, the various image processing blocks 321 to 325 of the image computing circuit 32 perform a matrix process. FIG. 4A and FIG. 4B are diagrams illustrating an example of a matrix process. In a matrix process, for instance, a computation is performed using pixel values of a plurality of pixels that straddle a plurality of lines. In a matrix process, for instance, there is executed a process using pixel values within a matrix area. A matrix is herein an area of a plurality of pixels represented by a square, in the horizontal and the vertical direction of an image frame. For instance, a matrix denotes a number of pixels in a first direction and a number of pixels in a second direction orthogonal to the first direction, when the number of pixels in the first direction is identical to the number of pixels in the second direction. Alternatively, for instance, a matrix may denote an area of a plurality of pixels arrayed across a plurality of lines, an area of a plurality of pixels arrayed for each line, or areas in which the number of pixels is the same in each area.

In the example of FIG. 4A and FIG. 4B, 3 pixel×3 pixel is the matrix area, such that the pixel value of the center pixel (b, 2) is outputted as a result of the matrix process. Besides a matrix process, any other process can be executed, provided that the process can be performed across a plurality of lines.

For instance, the gain processing circuit 321 performs a gain process on the pixel value of the center pixel by, for instance, averaging, or multiplying by a coefficient, the pixel values of the nine pixels in the matrix area. The RGB/YUV conversion circuit 322, for instance, substitutes the pixel values of the nine pixels in a formula, to perform conversion thereby to a YUV pixel value, for the pixel value of the center pixel. The smoothing circuit 323, the color correction processing circuit 324 and the bandpass filter circuit 325 perform similarly processes using the plurality of pixels in the matrix area. The matrix process itself may be an instance of image processing in the image processing blocks 321 to 325. Alternatively, the matrix process may be performed in each image processing block 321 to 325, after which a respective image processing is carried out. The image processing, for instance, includes a matrix process.

Other than 3 pixel×3 pixels, the area of the matrix in the matrix process may be 7×7, 9×9, 11×11 or the like, so long as the area of the number of pixels is such that a center pixel is disposed in the area. The matrix process is described in detail further on.

Returning to FIG. 2, the memory 33 stores the image data outputted by the bandpass filter circuit 325. The memory 33 may store image data over a given period of time, or may store the image data until a delete instruction is inputted from the CPU 21 or the like. The memory 33 may be provided so as to be attachable to/removable from the digital camera 100. Upon display of an image on the display unit of the digital camera 100, for instance, the display unit is controlled so that image data is read from the memory 33 and is displayed on the display unit.

In response to a command from the CPU 21, the address decoder circuit 34, for instance, stores data comprised in the command at a certain address of a memory in the address decoder circuit 34, and outputs the stored data to the scheduling circuit 35 and/or the image computing circuit 32.

FIG. 5 is a diagram illustrating examples of commands. One command outputted by the CPU 21 is a set of an "address" and "data". For instance, the "address" indicates an address in the memory of the address decoder circuit 34, and the "data" of the command established beforehand is stored at that address. The "data" in the command denotes a value of the command. In the example illustrated in FIG. 5, an address "0001" denotes an address where a matrix size value is held in the address decoder circuit 34. A matrix size value (for instance, "3" is stored in the case of a 3×3 pixel matrix) is stored in that address. The command may be a command that indicates a presence or absence of an edge process. The edge process is a process that in some instances is carried out, and in some instances not, during execution of the matrix process. Therefore, the command that designates the edge process includes a value in the form of data that denotes the presence or absence of the edge process (for instance, edge process present if the value is "1", edge process absent if the value is "0"). The edge process will be explained further on. After power-on of the digital camera 100, for instance, the CPU 21 outputs various commands to the address decoder circuit 34, as described above.

Returning to FIG. 2, the address decoder circuit 34 receives the input of the command outputted by the CPU 21, stores data comprised in the command at a certain address, for each type of command, and outputs data comprised in the command according to the type of the command. For instance, the address decoder circuit 34 outputs a matrix size value and the presence or absence of the edge process, to the scheduling circuit 35, outputs a smoothing coefficient to the smoothing circuit 323, and outputs a color correction coefficient to the color correction processing circuit 324.

The scheduling circuit (scheduling unit, scheduling apparatus) 35 calculates the number of wait lines on the basis of the matrix size value and the presence or absence of the edge process, and outputs the calculated number of wait lines to the image data input control circuit 31.

Figure 6:
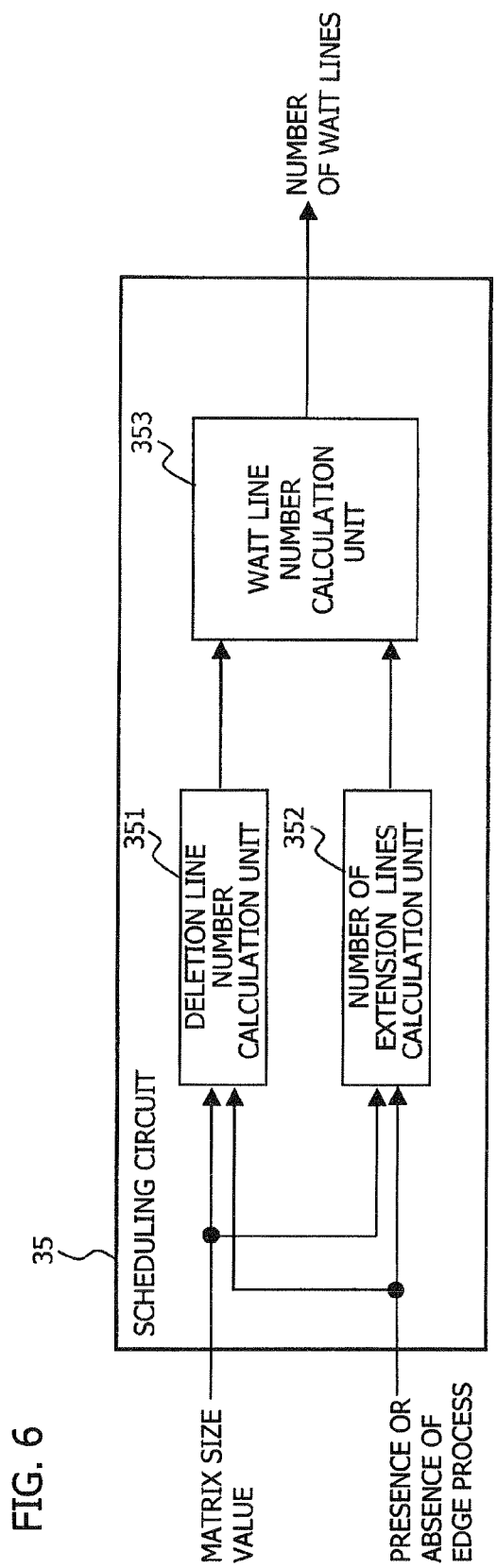
FIG. 6 is a diagram illustrating a configuration example of a scheduling circuit 35.

FIG. 6 is a diagram illustrating a configuration example of the scheduling circuit 35. The scheduling circuit 35 comprises a deletion line number calculation unit 351, an extension line number calculation unit 352, and a wait line number calculation unit 353.

The deletion line number calculation unit 351 calculates the number of deletion lines on the basis of the matrix size value and the presence or absence of the edge process, and outputs the calculated number of deletion lines to the wait line number calculation unit 353.

(Matrix Process)

A matrix process will be described to explain the number of deletion lines. FIG. 7A to FIG. 11D are diagrams illustrating an example of a matrix process. From among the figures, FIG. 7A to FIG. 7J are diagrams for explaining an operation example of a 3×3 pixel matrix process in a case where an edge process is performed.

The image processing blocks 321 to 325 that perform a matrix process, for instance, may not create a 3×3 pixel matrix for a pixel (a,1) in a first line of inputted image data by using that pixel, without modification, as a center pixel (for instance, FIG. 7B). Therefore, the image processing blocks 321 to 325 perform interpolation by copying the pixel values of the pixels in the first line and last line, and the first column and the last column, of the image frame, to extend the image frame (for instance, as illustrated in FIG. 7C). That is, the pixels at the edges of the image frame are extended through copying. A nine pixel matrix ((a, 1) to (a, 3), (a, 1) to (a, 3), and (b, 1) to (b, 3)) can be created as a result having the pixel (a, 1) as the center pixel. Similarly, a nine pixel matrix ((g, 7) to (g, 8), (h, 7) to (h, 8), (h, 7) to (h, 8)) can be created as a result having the pixel (h, 8) in the last line as the center pixel.

After matrix creation, the image processing blocks 321 to 325 calculate the pixel value of the center pixels using the created matrices.

Upon output of output image data, the image processing blocks 321 to 325 output image data by performing a process in such a manner that the number of pixels is identical to that in the input image data (for instance, FIG. 7D).

Thus, the edge process is a process of initiating a matrix process using a copied (replicated) pixel value. Alternatively, the edge process is a process of initiating a matrix process through interpolation by copying pixels at the frame edge (fringe), such that the output image data has thereafter the same number of pixels as the input image data.

FIG. 8A to FIG. 8G illustrate examples of waveform diagrams in a 3×3 pixel matrix process by the image processing blocks 321 to 325 in a case where an edge process is present. FIG. 8A illustrates the timing at which image data for one line is inputted, such that image data is inputted at "HIGH". The image processing blocks 321 to 325 are provided each, for instance, with an input buffer, and two line buffers (LB-1 and LB-2). FIG. 8B to FIG. 8D illustrate the image data of which line is inputted to the input buffer and the two line buffers. FIG. 8E illustrates the timing at which image data for one line is outputted, such that image data is inputted at "HIGH".

Simultaneously with input of the image data of line "a" (FIG. 8D), the image processing blocks 321 to 325 write for instance the image data in the input buffer, and write then the image data in the line buffer LB-1 (FIG. 8C), as illustrated in FIG. 8C and FIG. 8D. As a result, the image data in the first line "a" is copied, and the image frame is extended (for instance, FIG. 7C). For the last line "h", the image data is written in the line buffer LB-1 at the next timing of writing to the input buffer.

Upon input of image data of the second line "b", for instance, image data of line "a" is stored in the two line buffers LB-1, LB-2, and image data of line "b" is stored in the input buffer. Accordingly, there can be created a matrix using each line "a", "a" and "b". Therefore, a matrix process is performed for the first line "a", and output data "a" of the first line can be output (for instance, FIG. 8E). The above is repeated thereafter in the sequence of lines.

FIG. 8F and FIG. 8G are the same as FIG. 8A and FIG. 8E, but illustrate the input-output relationship in a manner that is easier to visualize. Focusing on a leading line in a 3×3 pixel matrix process with an edge process, the image data is outputted with one-line deletion, at the input timing and the output timing, as illustrated in FIG. 8F and FIG. 8G. At the output timing, image data is outputted after being delayed by one line with respect to the input timing, on the basis of a matrix process relationship. Depending on the influence of the processing time of the matrix process, thus, there are instances where, in the matrix process, an output waveform of a leading line is outputted after being subjected to deletion (or delay) of a certain line, with respect to the input waveform. The number of lines in this difference is called, for instance, a number of deletion lines. In a 3×3 pixel matrix process, for instance, the number of deletion lines is "1" in a case where an edge process is carried out.

Focusing on the waveform of a last line, FIG. 8F and FIG. 8G are output waveforms for one line, after input of the image data of a last line "h". In this case as well, the matrix is created after input of the image data of the last line (for instance, FIG. 8C and FIG. 8D). Accordingly, there occurs a delay of one line at the output timing of the output image data, with respect to the input image data. Depending on the influence of the processing time of the matrix process, thus, there are instances where, in the matrix process, an output waveform of a last line is outputted after being extended (or delayed) by a certain number of lines, with respect to the input waveform. The number of lines in this difference is called, for instance, a number of extension lines. In a 3×3 pixel matrix process, for instance, the number of extension lines is "1" in a case where an edge process is carried out.

An explanation follows next on a 3×3 pixel matrix process in a case where no edge process is carried out. FIG. 9A to FIG. 9G are diagrams illustrating examples of a matrix process without an edge process.

The image processing blocks 321 to 325 may not create a matrix in a case where, for instance, a pixel to be processed is at the edge of an image frame (for instance, pixel (a,1)). In this case, a process pixel is a pixel inward by one pixel from the edge of the image frame (for instance, pixel (b, 2)). Absence of an edge process denotes herein a process in which, for instance, pixels around the edge of an image frame are erased and the result is outputted, on the basis of a relationship wherein pixels at the edge of an image frame are not processed and pixels inward by one pixel from the edge are processed. As illustrated in FIG. 9C, in the absence of an edge process the pixels within the shaded area are erased, and there is outputted, as output data, the pixel value of pixels inward by one pixel. The feature whereby a pixel value of a center pixel is obtained using a plurality of pixels is the same in an instance where no edge process is carried out as in an instance where an edge process is carried out (for example, FIG. 9D to FIG. 9G).

FIG. 10A to FIG. 10G are diagrams illustrating examples of waveform diagrams of a matrix process without an edge process. FIG. 10A illustrates the timing at which image data for one line is inputted, such that image data is inputted to the image processing blocks 321 to 325 at "HIGH". FIG. 10B to FIG. 10D illustrate which line the image data is inputted to. FIG. 10E illustrates the timing at which image data for one line is outputted, such that image data is outputted at "HIGH".

For instance, the image data of a line "a" is stored in the input buffer at the timing at which an initial line "a" of the image frame is inputted. Next, the image data of line "a" that is stored in the input buffer is stored in the line buffer LB-1, and the image data of the inputted line "b" is stored in the input buffer, at the timing at which the image data of a next line "b" is inputted. Next, the image data of a line "c" is stored in the input buffer, the image data of line "b" is stored in the line buffer LB-1, and the image data of line "a" is stored in the line buffer LB-2, at the timing at which the image data of line "c" is inputted. The image data for three lines is thus put together, so that, as a result, the image processing blocks 321 to 325 can create a matrix (in FIG. 9D and FIG. 9F. For instance, there can be outputted an initial line "b" at the timing at which the image data of line "c" is inputted. The above is repeated thereafter in the sequence of lines.

FIG. 10F and FIG. 10G are the same as FIG. 10A and FIG. 10E, but illustrate the input-output relationship in a manner that is easier to visualize. Focusing on a leading line, an output waveform is delayed by two lines with respect to the input waveform, in the input-output relationship, as illustrated in FIG. 10F and FIG. 10G. In a 3×3 pixel matrix process without an edge process, therefore, the number of deletion lines is "2". Focusing on the output number of lines, the input waveform and the output waveform end at the same timing. Therefore, the number of extension lines is "0" in this case.

In a 3×3 pixel matrix process, in summary, the number of deletion lines is "1" and the number of extension lines is "1", if an edge process is carried out. In a 3×3 pixel matrix process, the number of deletion lines is "2" and the number of extension lines is "0", if no edge process is carried out.

Thus, the number of deletion lines and the number of extension lines may take on dissimilar values, depending on the presence or absence of the edge process, for a same matrix size. The number of deletion lines and the number of extension lines may take on dissimilar values according to a matrix size. FIG. 11A and FIG. 11B are diagrams illustrating examples of input waveforms and output waveforms in a case where an edge process is carried out in a 5×5 pixel matrix process. FIG. 11C and FIG. 11D are diagrams illustrating an example of input waveforms and output waveforms in a 5×5 pixel matrix process without an edge process.

In a case where an edge process is carried out in the 5×5 pixel matrix process, for instance, there is created image data of two lines by performing copying twice, for the input of an initial one line, and there is created a matrix for the initial first line, upon input of image data of a third line. As illustrated in FIG. 11B, the number of deletion lines is "2". In the last line as well, image data of two lines is created by performing copying twice after last line input. Hence, the number of extension lines is "2".

FIG. 11C and FIG. 11D are diagrams illustrating the relationship between input waveforms and output waveforms in a 5×5 pixel matrix process without an edge process. A detailed explanation of this case will be omitted, but the number of deletion lines is "4" and the number of extension lines is "0".

Thus, the number of deletion lines and the number of extension lines are dissimilar depending on a size of the matrix and a presence or absence of the edge process. Returning to FIG. 6, the deletion line number calculation unit 351 calculates the above-described number of deletion lines on the basis of the inputted matrix size value and on the presence or absence of the edge process. The calculation process is explained in detail further on.

The extension line number calculation unit 352 calculates the above-described number of extension lines on the basis of the matrix size value outputted by the address decoder circuit 34 and on the presence or absence of the edge process. The calculation process is explained in detail further on.

The wait line number calculation unit 353 calculates the number of wait lines on the basis of the calculated number of deletion lines and number of extension lines, and outputs the result to the image data input control circuit 31. The wait line number calculation process is explained in detail further on.

(Operation Example of the Image Processing Apparatus)

Figure 12:
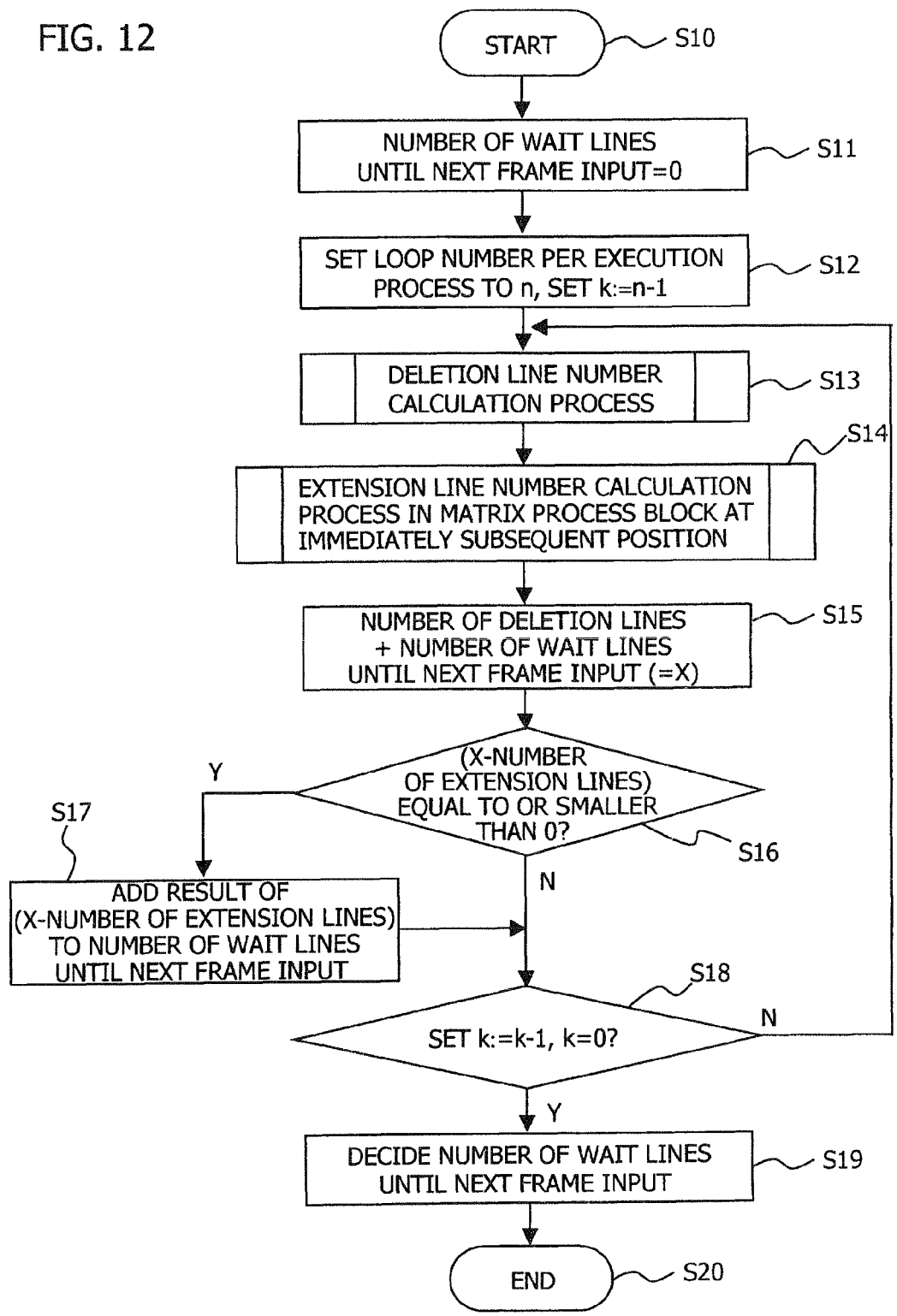
FIG. 12 is a flowchart illustrating an operation example of a wait line number calculation process.

An operation example will be explained next. FIG. 12 is a flowchart illustrating an operation example of the wait line number calculation process in the scheduling circuit 35.

The wait line number calculation process is performed, for instance, upon power-up, since the CPU 21 outputs commands at that time. The wait line number calculation process is carried out independently from image data processing (image processing performed by the image computing circuit 32). The wait line number calculation process is carried out before image processing is performed on image data. The number of wait lines is outputted to the image data input control circuit 31.

In the wait line number calculation process, calculations are performed for each of the image processing blocks 321 to 325 of the image computing circuit 32 that performs image processing, on the basis of the number of deletion lines and the number of extension lines in the matrix process of the image processing blocks 321 to 325.

Figure 14:
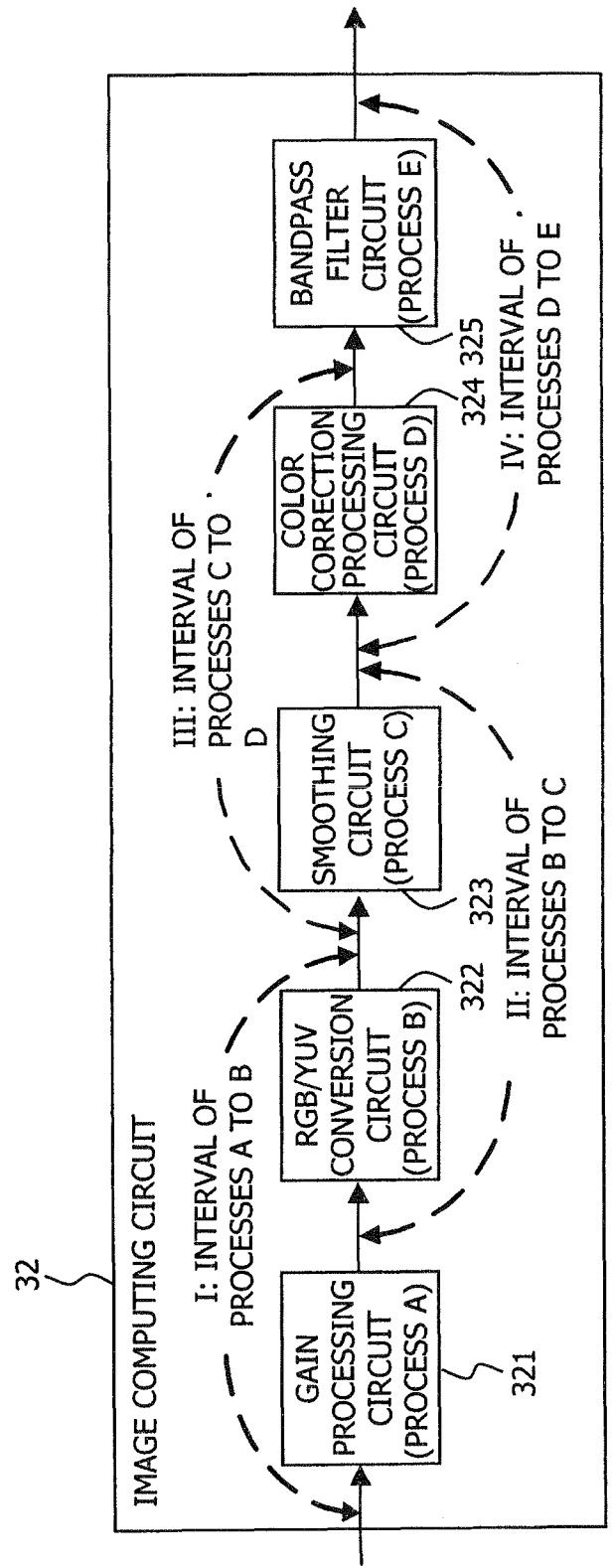
FIG. 14 is a diagram illustrating an example of a process object in a wait line calculation process.

FIG. 14 is a diagram illustrating an example of a process object in the wait line calculation process. In the wait line number calculation process, a plurality of loops are performed in accordance with the number of image processing blocks in the image computing circuit 32 (S13 to S18). The number of wait lines is accumulated through repeated loops while calculating number of wait lines in each loop, to calculate the final number of lines, upon completion of the last loop. For instance, the scheduling circuit 35 calculates the number of wait lines in an interval (process I) of the RGB/YUV conversion circuit 322 and the gain processing circuit 321, in an initial loop. The scheduling circuit 35 calculates the number of wait lines in an interval (process II) of the RGB/YUV conversion circuit 322 and the smoothing circuit 323 at the next loop. The scheduling circuit 35 calculates thus the number of wait lines on the basis of the wait line number calculation process, with process I to process IV as the process objects.

Figure 15:
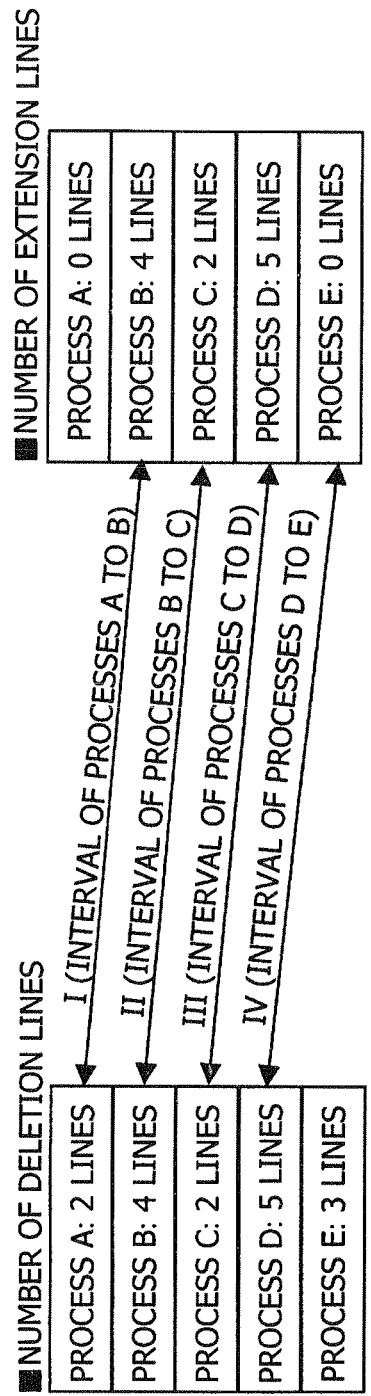
FIG. 15 is a diagram illustrating an example of a process object in a wait line calculation process.

FIG. 15 is a diagram illustrating an example of a wait line number calculation process, where a process for calculating the number of wait lines is carried out depending on the portion from process I to process IV. As illustrated in FIG. 15, in process I of the wait line calculation process, calculation is performed on the basis of the number of deletion lines in the matrix process ("process A" in FIG. 15) of the gain processing circuit 321, and the number of extension lines in the matrix process ("process B" in FIG. 15) in the RGB/YUV conversion circuit 322 that is the next process block. In process II, the number of wait lines is calculated on the basis of the number of deletion lines in the matrix process ("process B") in the RGB/YUV conversion circuit 322, and the number of extension lines in the matrix process ("process C" in FIG. 15) in the smoothing circuit 323. In process III and process IV, the wait line number calculation process is carried out using, as process objects, the number of deletion lines and the number of extension lines, such as those illustrated in FIG. 15. The grounds for performing the calculations while referring not to a same block but to a subsequent matrix process block are explained further on.

In the example illustrated in FIG. 15, the gain processing circuit 321 performs a matrix process ("process A") of a 3×3 pixel matrix process without an edge process. The RGB/YUV conversion circuit 322 performs a 9×9 matrix process with an edge process ("process B"). The smoothing circuit 323 performs a 5×5 pixel matrix process with an edge process ("process C"), the color correction processing circuit 324 process a 11×11 pixel matrix process with an edge process ("process D"), and the bandpass filter circuit 325 process a 5×5 pixel matrix process without an edge process ("process E").

As a result of the below-described deletion line calculation process and the extension line calculation process, the number of deletion lines in "process A" is calculated as "2", and the number of extension lines is calculated as "0". The calculated number of deletion lines in "process B" is "4", and the calculated number of extension lines is "4", FIG. 15 illustrates the results calculated in each calculation process.

The wait line number calculation process is explained next returning to FIG. 12. For easier comprehension, the matrix process in the image processing blocks 321 to 325 will be the above-described example in which the process A is a 3×3 pixel process without an edge process, the process B is a 9×9 pixel process with an edge process, and so forth. The number of deletion lines and the number of extension lines are computed, as illustrated in FIG. 15, in accordance with the below-described calculation process.

Upon start of the wait line number calculation process (S10), the scheduling circuit 35 sets the number of wait lines until the next frame input to "0" (S11). For instance, the wait line number calculation unit 353 sets the number of wait lines, as the initial value, to "0".

Next, the scheduling circuit 35 sets the loop count k to (n−1), where n is the number of loops per execution process (S12). For instance, this setting is performed by the wait line number calculation unit 353. For instance, the process object in the wait line number calculation unit 353 is process I, for the initial loop.

Next, the scheduling circuit 35 performs a deletion line number calculation process (S13). This process is performed, for instance, by the deletion line number calculation unit 351.

Figure 13A:
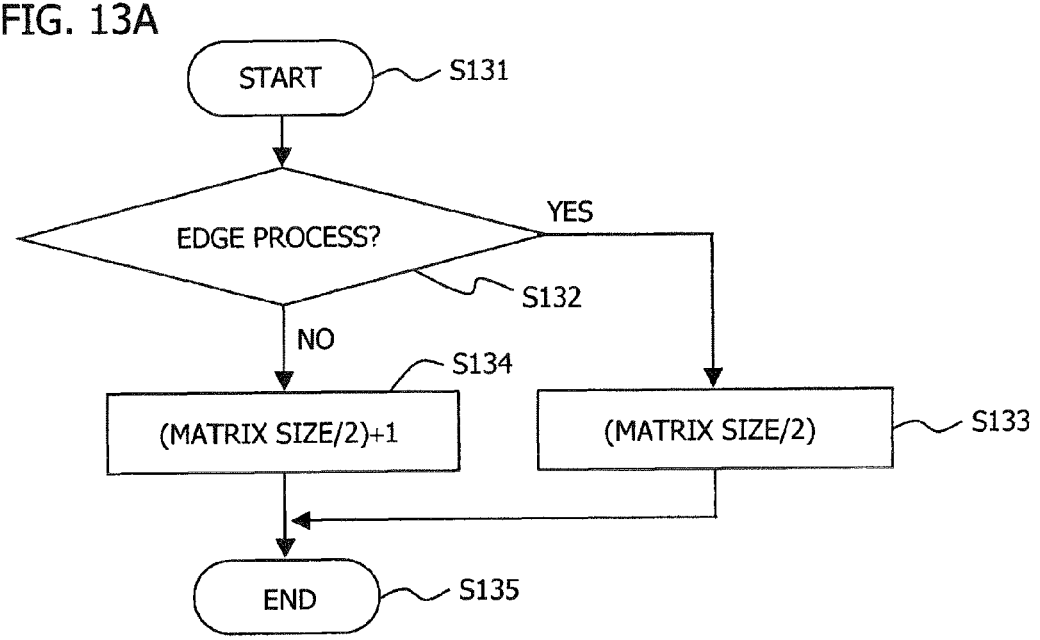
FIG. 13A is a flowchart illustrating an operation example of a deletion line number calculation process.

FIG. 13A is a flowchart illustrating an operation example of the deletion line number calculation process. Upon process start (S131), the deletion line number calculation unit 351 checks the presence or absence of the edge process as outputted by the address decoder circuit 34 (S132).

If there is an edge process, the deletion line number calculation unit 351 computes (matrix size value/2 (rounded down at the decimal point)) as the number of deletion lines ("Yes" in S132, S133).

If there is no edge process, the deletion line number calculation unit 351 computes (matrix size value/2+1 (rounded down at the decimal point)) as the number of deletion lines ("No" in S132, S134).

In the example illustrated in FIG. 15, for instance, there is no edge process in the "process A" (gain processing circuit 321) of process I, and the matrix size value is "3" (indicative of 3×3 pixels). Therefore, N is obtained in S132, and the process of S134 is executed. In this case, the number of deletion lines is computed as "3/2+1", rounded down to "2" at the decimal point.

The deletion line calculation process is over (S135) once the deletion line number calculation unit 351 has calculated the number of deletion lines (S133, S134).

Returning to FIG. 12, the scheduling circuit 35 performs next an extension line number calculation process for the matrix process block positioned immediately thereafter (S14). A matrix process block positioned immediately thereafter denotes, for instance, an image processing block at which a next matrix process is performed, with respect to the image processing block that is the object of the number of deletion lines calculated by the deletion line number calculation process (S13). In a case where the number of deletion lines is calculated in the gain processing circuit 321 (S13), the immediately subsequent matrix process block is the RGB/YUV conversion circuit 322.

Figure 13B:
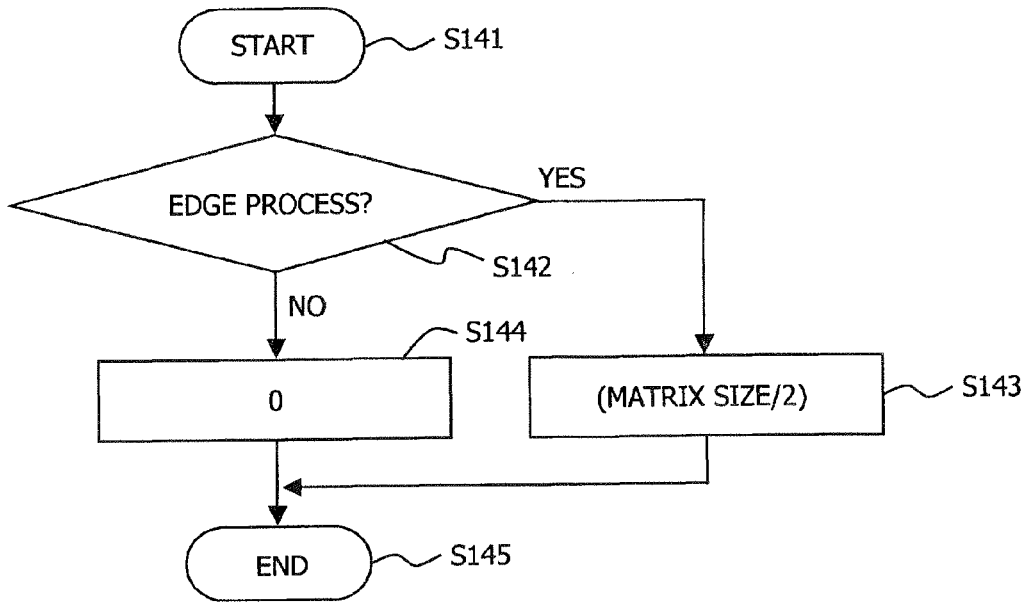
FIG. 13B is a flowchart illustrating an operation example of an extension line number calculation process.

FIG. 13B is a flowchart illustrating an operation example of the extension line number calculation process. Upon process start (S141), the extension line number calculation unit 352 checks the presence or absence of the edge process as outputted by the address decoder circuit 34 (S142).

If there is an edge process, the extension line number calculation unit 352 computes (matrix size value/2 (rounded down at the decimal point)) as the number of extension lines ("Yes" in S142, S143).

If there is no edge process, the extension line number calculation unit 352 calculates "0" as the number of extension lines ("No" in S142, S144). If there is no edge process, as illustrated in FIG. 10G and FIG. 11D, there can be created a matrix in the last line input, and the matrix process can be terminated. The number of extension lines is therefore "0".

In the example of FIG. 15, the matrix process in the "process B" (RGB/YUV conversion circuit 322) is a 9×9 matrix process with an edge process. Therefore, "Yes" is obtained in S142, and in S133 there is calculated a number of extension lines "4".

Returning to FIG. 12, next, the wait line number calculation unit 353 adds the computed number of wait lines at a previous loop (S17) to the number of deletion lines (S15). In the initial loop (process I), "0" is set as the initial value of the number of wait lines (S11). Therefore, the wait line number calculation unit 353 adds "0" to the number of deletion lines "2".

Next, the wait line number calculation unit 353 subtracts (S16) the number of extension lines calculated in S14 from the (number of deletion lines+number of wait lines=X) computed in S15 so as to determine whether or not the subtraction value is equal to or smaller than "0".

As explained in detail below, there may be a portion where, for instance, the output timing of the last line of the first frame and the input timing of the leading line of the second frame overlap, in each process block, when the subtraction value is equal to or smaller than "0". Conversely, an instance arises where, for instance, the leading line of the second frame is inputted after the output timing of the last line in the first frame, when the subtraction value is equal to or greater than "1".

On the basis of the process of S16, the scheduling circuit 35 determines, for instance, whether or not there is a delay of a certain number of lines between respective frames, or determines whether a number of wait lines is to be calculated or not.

When the subtraction value is equal to or smaller than "0" (Y in S16), the scheduling circuit 35 calculates the subtraction value as the number of wait lines (S17). For instance, this calculation is performed by the wait line number calculation unit 353, such that "2" is calculated as the number of wait lines when the subtraction value is "−2", and "5" is calculated as the number of wait lines when the subtraction value is "−5".

In the example of FIG. 15, the number of deletion lines in the matrix process of the gain processing circuit 321, in process I, is "2" (S13), the number of extension lines of the matrix process in the RGB/YUV conversion circuit 322 is "4" (S14), the subtraction value is "−2", and "2" is calculated as the number of wait lines (S17). The wait line number calculation unit 353 adds the calculated number of wait lines to the number of wait lines calculated up to a previous loop. In the example of process I, the calculated number of wait lines "2" is added to "0" that is set in S11 on account of the initial loop.

If the subtraction value is equal to or smaller than "0" (N in S16), the scheduling circuit 35 does not calculate the number of wait lines, but performs the process of S18. Between frames, the leading line of a next frame is inputted after output of the last line in a previous frame as described above, if the subtraction value is equal to or smaller than "0". Therefore, the scheduling circuit 35 may omit calculation of the number of wait lines (the calculated number of wait lines up to the previous loop is maintained).

The scheduling circuit 35 adds the number of wait lines (S17), or, if the subtraction value is not "0" (N in S16), sets next k to (k−1), to subtract one loop from the loop count, and determines whether the set k is "0" (S17). In the example of FIG. 15, it is determined whether the loop from process I to process IV is over or not.

Once all the processes are over (when k=0, Y in S18), the scheduling circuit 35 establishes the number of wait lines accumulated through the loops up to that time, as the number of wait lines (S19), outputs the number of wait lines to the image data input control circuit 31, and terminates the wait line number calculation process (S20).

If the processes are not all over (when k is not 0, N in S18), the process moves again to S13, and the wait line number calculation unit 353 repeats the above-described process.

In the example of FIG. 15, the loop from S13 to S18 is repeated again after completion of process I. In the second loop there is calculated the number of wait lines for process II. In this case, X, which is the number of deletion lines "4"+number of wait lines "2"="6", and the result upon subtraction of number of extension lines "2" is not equal to or smaller than "0" (N in S16). Therefore, the number of wait lines is not calculated. In this case, the cumulative value of the number of wait lines remains "2".

In the third loop there is calculated the number of wait lines for process III. Herein, X=number of deletion lines "2"+number of wait lines "2"="4", and "−1" is obtained upon subtraction of the number of extension lines "5" (Y in S16). In this case, the wait line number calculation unit 353 calculates the number of wait lines as "1", and takes the number of wait lines as "3", resulting from addition to the number of wait lines "2" calculated thus far.

In the fourth loop there is calculated the number of wait lines for process IV. Herein, X=number of deletion lines "5"+number of wait lines "3"="8". Subtraction of the number of extension lines "0" yields "8", which is not equal to or smaller than "0" (N in S16). In this case, the wait line number calculation unit 353 calculates the number of wait lines of the process object (k=0, Y in S18), and the number of wait lines "3" is the final number of wait lines (S19).

The wait line number calculation unit 353 outputs the number of wait lines "3" as the "number of wait lines until next frame input", to the image data input control circuit 31.

After output of the last line of the frame of the inputted image data, the image data input control circuit 31 does not output the leading line of the second frame at the next timing, but performs delay by "3" lines, and outputs the leading line of the second frame to the gain processing circuit 321. As a result, this allows inputting image data of a next frame, after output of the image data of a previous frame, while maintaining the consistency of image data, in all the image processing blocks (gain processing circuit 321 to bandpass filter circuit 325) of the image computing circuit 32. The image data for which the respective image processes are sequentially carried out in the inputted frame sequence are stored in the memory 33.

FIG. 16A to FIG. 16G are diagrams illustrating examples of waveforms in the image processing blocks when the number of wait lines is "3". As indicated by the arrows within circles in FIG. 16A to FIG. 16G, there are no timings at which the output of the first frame and the input of the second frame overlap in the image processing blocks. For instance, in a process D (color correction processing circuit 324), the last line of the image data of the first frame is outputted, after which, at the next timing, there is inputted the leading line of the image data of the second frame, as illustrated in FIG. 16E. The waveform diagrams illustrated in FIG. 16A to FIG. 16G indicate that data consistency is maintained in the present embodiment.

In the present image processing apparatus no process is executed wherein all pixels in all frames of the input image data are determined. Instead, there are just executed processes of, for instance, calculating a number of deletion lines, and comparing subtraction values. Therefore, processing time and power consumption can be reduced as compared with a case where all pixels are determined.

(Grounds and so Forth on the Computation of Subtraction Values)

An explanation follows next on the grounds, among other considerations, for calculating (S16, S17) the number of wait lines on the basis of the subtraction value that is computed in the wait line number calculation process (for instance, in FIG. 12).

Figure 17A:
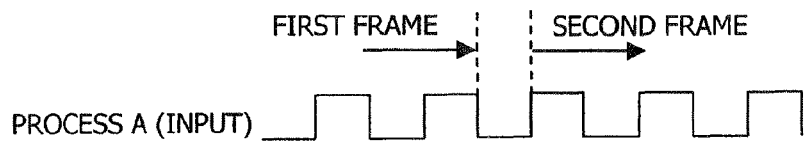
FIG. 17A to FIG. 17D are diagrams illustrating examples of waveforms in image processing blocks.

FIG. 17A to FIG. 18E are diagrams illustrating examples of waveforms in the image processing blocks 321 to 324. FIG. 17A illustrates an example of a waveform diagram between frames in a case where frames are inputted in continuous timing, without wait lines, to the gain processing circuit 321 ("process A"). The example of FIG. 15 will be used as the example of the matrix process in the image processing blocks 321 to 324.

When the image data input control circuit 31 outputs each frame at a continuous timing, without delaying by a number of wait lines, image data is inputted to the gain processing circuit 321 at a timing such as the one illustrated in FIG. 17A. As illustrated in FIG. 17A, the gain processing circuit 321 has inputted thereto the last line of a first frame, followed by input of the leading line of a second frame at the next timing.

Figure 17B:
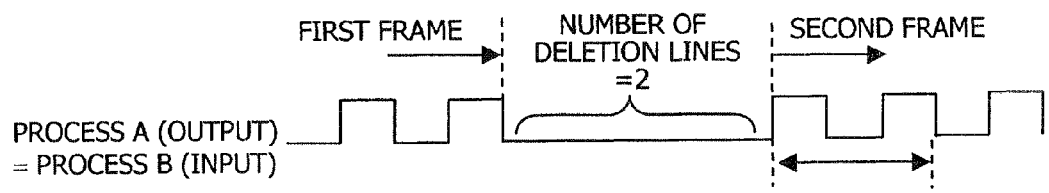

In this case, the number of deletion lines is "2" in the gain processing circuit 321, and hence the inter-frame waveform diagram between the first frame and the second frame, as outputted by the gain processing circuit 321 is, for instance, as the waveform diagram illustrated in FIG. 17B. In the input-output relationship, the leading line of the second frame is outputted in such a manner that "two lines" are deleted.

For instance, this waveform is inputted as-is to the RGB/YUV conversion circuit 322. The number of extension lines at that time is "4" in the RGB/YUV conversion circuit 322 ("process B"). Therefore, the waveform diagram outputted by the RGB/YUV conversion circuit 322 is, for instance, as the waveform diagram illustrated in FIG. 17C.

Figure 17C:
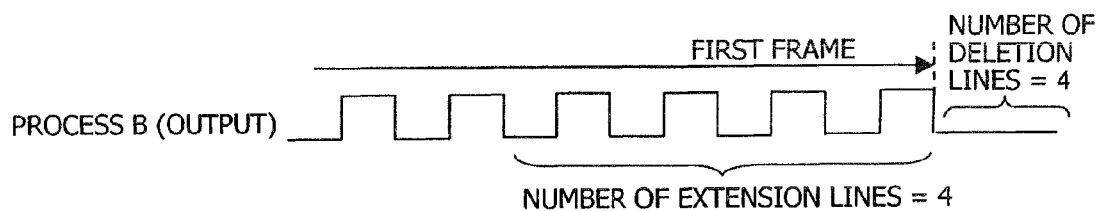

Focusing on FIG. 17B and FIG. 17C, image data of the second frame is inputted (FIG. 17B) to the RGB/YUV conversion circuit 322 before the output of the image data of the first frame is completely over (FIG. 17C). The RGB/YUV conversion circuit 322 carries out a process at a timing at which the last two lines of the first frame and the initial two lines of the second frame overlap each other. In such a case, the process is carried out in a state of no image data consistency between frames.

In the wait line number calculation process (for instance, FIG. 12) there is determined whether or not the subtraction value (X-number of extension lines) is equal to or smaller than "0" (S16). In the case of the example, the number of deletion lines is "4", the number of extension lines is "2" and the subtraction value is "−2". This value "−2" indicates that the number of overlapping lines is "2" lines.

Figure 17D:
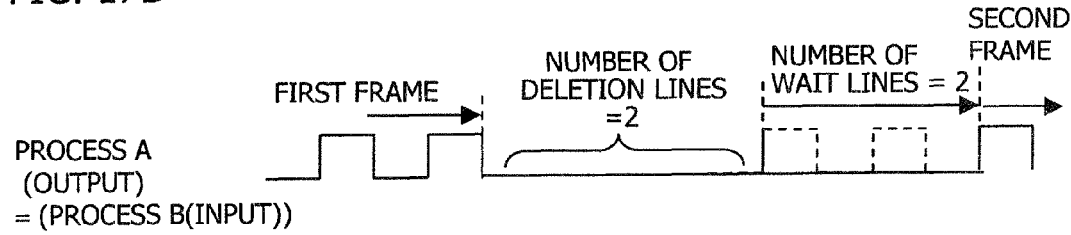

Accordingly, the scheduling circuit 35 sets the number of wait lines=2 and outputs the number of wait lines to the image data input control circuit 31. The image data input control circuit 31 delays the output timing of the next frame by "2" lines, and outputs the next frame. The next frame is outputted delayed by two lines in the gain processing circuit 321 as well. FIG. 17D is a diagram illustrating an example of an output waveform of the first frame and the second frame in the gain processing circuit 321 (or an input waveform of the RGB/YUV conversion circuit 322). A comparison between FIG. 17C and FIG. 17D reveals that in the RGB/YUV conversion circuit 322, the leading line of the second frame is inputted (FIG. 17D) after output of the last line of the first frame (FIG. 17C). Image data consistency between frames is thus maintained.

Figure 18A:
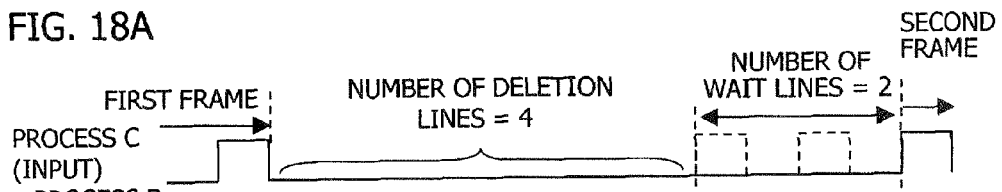
FIG. 18A to FIG. 18E are diagrams illustrating examples of waveforms in image processing blocks.
Figure 18B:
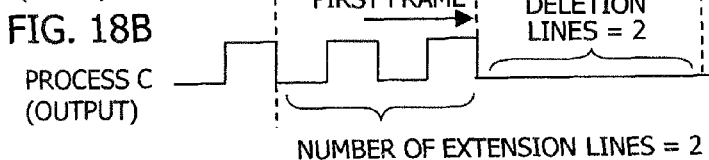

FIG. 18A and FIG. 18B illustrate examples of inter-frame waveform diagrams between a first frame and a second frame in the smoothing circuit 323 ("process C"), in a case where number of wait lines=2.

As illustrated in FIG. 18A, the input waveform in the smoothing circuit 323 is the output waveform of the RGB/YUV conversion circuit 322, which is inputted as-is. The number of extension lines is computed as "2" in the smoothing circuit 323 (for instance, FIG. 13B, FIG. 15). Therefore, the output waveform of the smoothing circuit 323 becomes a waveform diagram such as the one illustrated in, for instance, FIG. 18B.

A comparison between FIG. 18A and FIG. 18B indicates that in the smoothing circuit 323, the leading line of the second frame is inputted (FIG. 18A) after output the last line of the first frame is outputted (FIG. 18B). Frame consistency is maintained as a result. The subtraction value in the wait line number calculation process is "4", which is not equal to or smaller than "0". The number of wait lines need not thus be computed (N in S16 of FIG. 12). As illustrated in FIG. 18A and FIG. 18B, the subtraction value "4" indicates, for instance, the number of delay lines of the delay in the smoothing circuit 323 until input of the leading line of a next frame after output of the last line of a frame.

Figure 18C:
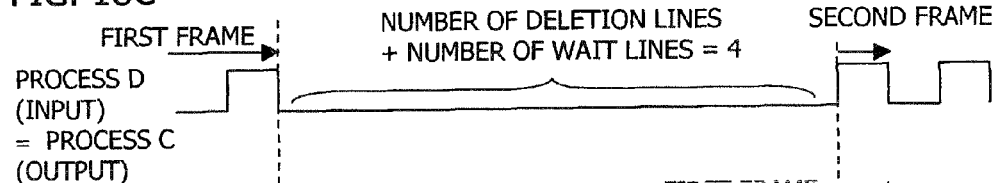
Figure 18D:
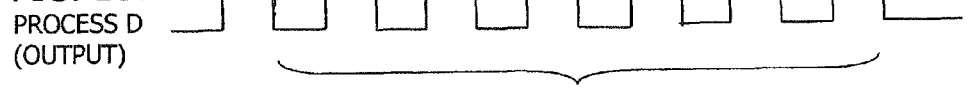

FIG. 18C and FIG. 18D illustrate examples of inter-frame waveform diagrams between a first frame and a second frame in the color correction processing circuit 324 ("process D") in a case where number of wait lines=2.

As illustrated in FIG. 18C, the output of the smoothing circuit 323 is inputted, as-is, to the color correction processing circuit 324. The number of extension lines is computed as "5" in the color correction processing circuit 324 (for instance, FIG. 13B, FIG. 15). Therefore, the output waveform of the color correction processing circuit 324 becomes for instance a waveform such as the one illustrated in FIG. 18D.

A comparison between FIG. 18C and FIG. 18D indicates that in the color correction processing circuit 324, the leading line of the second frame is outputted (FIG. 18C when the last line of the first frame is outputted (FIG. 18D). A one-line overlap period arises in this example. In the wait line number calculation process, the subtraction value is computed as "−1", which is equal to or smaller than "0" (Y in S16 of FIG. 12).

Figure 18E:
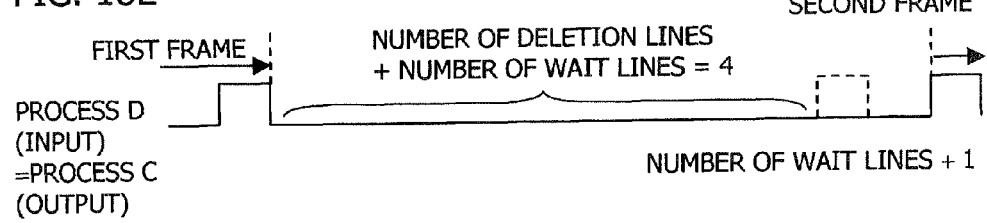

Therefore, the scheduling circuit 35 adds "1" of the subtraction value to the number of wait lines, and computes the sum total "3" as the number of wait lines. As illustrated in FIG. 18E, consistency is maintained as a result in the color correction processing circuit 324, since the leading line of the second frame is inputted (FIG. 18E) after output of the last line of the first frame (FIG. 18D).

In the wait line number calculation process, thus, computing of the subtraction value involves, for instance, checking (S16) whether the last line of a previous frame and the leading line of a next frame overlap each other, between frames, and if so, computing the number of overlapping lines as the number of wait lines (S17).

OTHER EXAMPLES

In the above-described examples, a digital camera 100 has been explained as an example of an image processing apparatus. An information portable terminal such as a mobile telephone or a PDA (Personal Digital Assistant) can also be used as the image processing apparatus. The examples explained above involved a digital camera 100 or camera-equipped mobile telephone 200 configured so as to capture images, but the examples apply also to information portable terminals such as mobile telephones or PDAs that receive image data via wireless communication.

Figure 19:
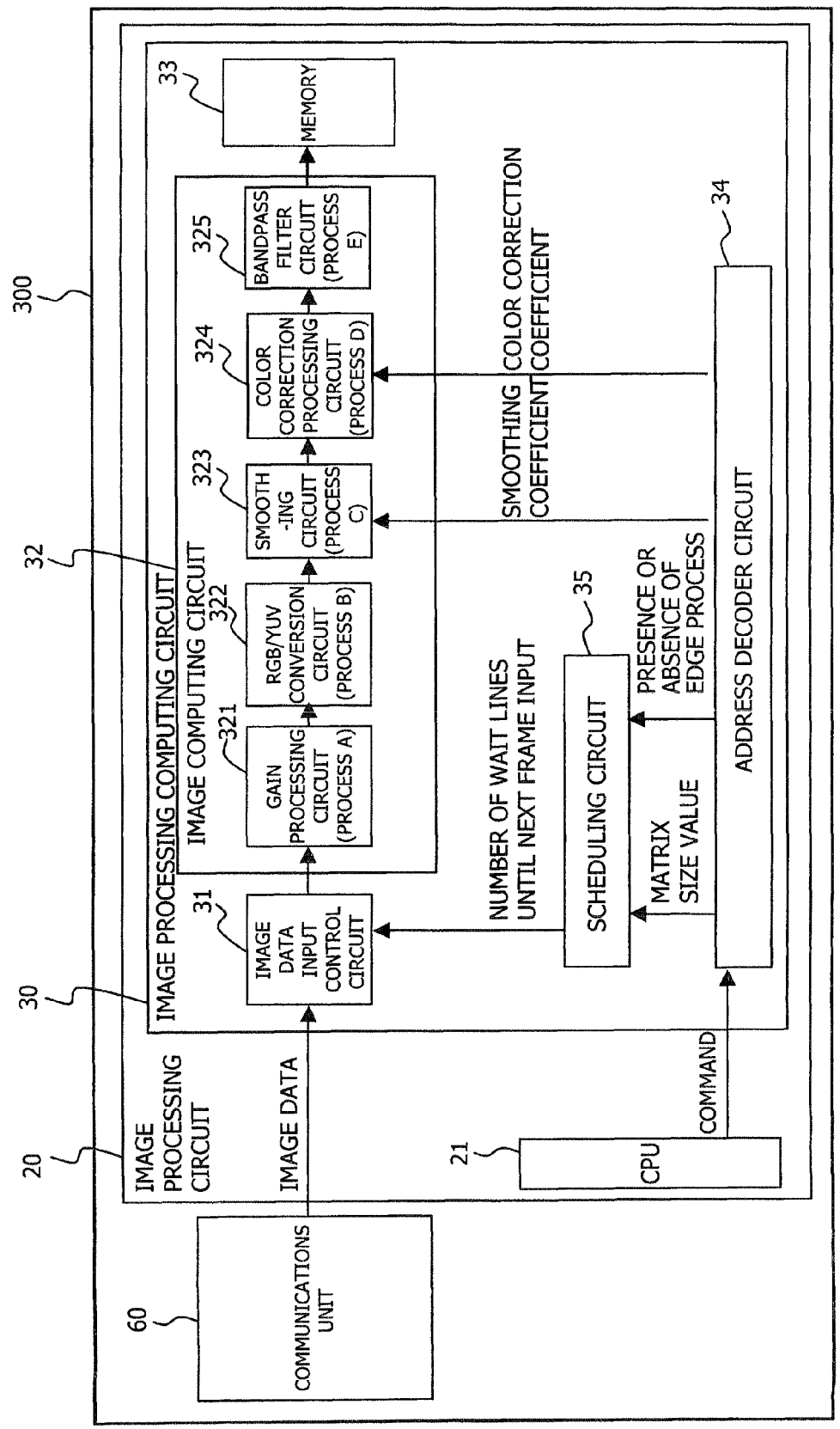
FIG. 19 is a diagram illustrating a configuration example of a PDA.

FIG. 19 is a diagram illustrating a configuration example of a PDA 300. The PDA 300 further comprises a communications unit 60. The communications unit 60 receives image data from an external apparatus, for instance a base station, via wireless communication, and outputs the image data to the image processing circuit 20. The communications unit 60 can also receive the image data from the external apparatus not by wireless communication but by wired communication. In this case, the image processing apparatus illustrated in FIG. 19 may be a personal computer, instead of a PDA.

In the image processing apparatus illustrated in FIG. 19 or FIG. 2, the memory 33 may have a storage unit in the form of a random-accessible disc-like recording medium, for instance, a hard disk, a DVD (Digital Video Disk) or the like. In this case, the image processing apparatus may be a recording and reproduction apparatus having a built-in hard disk or DVD. The present embodiment can be used in any apparatus, so long as the latter comprises the image processing circuit 20. Alternatively, the present embodiment can be used in any apparatus, so long as the apparatus comprises an image processing apparatus in the form of the image processing circuit 20 or the image processing computing circuit 30.

The invention succeeds in providing an image processing apparatus, an image processing method and a scheduling apparatus in which image data consistency is maintained. Likewise, the invention succeeds in providing an image processing apparatus, an image processing method and a scheduling apparatus in which processing time and power consumption are improved.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention, have been described in detail, it should be understood that the various changes, substitutions, and alterations could be made hereto without departing from the spirit and scope of the invention.

What is claimed is:

1. An image processing apparatus for performing image processing to image data, comprising:
    an image computing unit which performs to the image data the image processing including a matrix process performing a computation by using a pixel value of a plurality of pixels represented in a first direction and a second direction intersecting the first direction;
    a scheduling unit which calculates a number of wait pixels between first image frame and second image frame in the image data based on a size of the plurality of pixels and a presence or absence of an edge process of performing the matrix process using a copied pixel value; and
    an image data input control unit which outputs the image data of the first image frame to the image computing unit, delays an output of the image data of the second image frame by the number of wait pixels, and outputs the image data of the second image frame to the image computing unit.

2. The image processing apparatus according to claim 1, wherein
    the image computing unit sequentially performs a first matrix process and a second matrix process, and
    the scheduling unit calculates the number of wait pixels based on the size of the plurality of pixels and the presence or absence of the edge process in the first matrix process and second matrix process, respectively.

3. The image processing apparatus according to claim 1, wherein
    the scheduling unit calculates a number of delay lines before and after the matrix process based on the size of the plurality of pixels and the presence or absence of the edge process, and calculates the number of wait pixels based on the number of delay lines.

4. The image processing apparatus according to claim 1, wherein
    the scheduling unit includes:
    a deletion line number calculation unit which calculates as a number of deletion lines based on the size of the plurality of pixels and the presence or absence of the edge process, a number of delay line until the image data of a start line processed by the matrix process is output after the image data of the start line of an image frame is input in the matrix process performed by the image computing unit,
    an extension line number calculation unit which calculates as a number of extension lines based on the size of the plurality of pixels and the presence or absence of the edge process, a number of delay lines until the image data of a last line processed by the matrix process is output after the image data of the last line of the image frame is input in the matrix process performed by the image computing unit, and
    a wait line number calculation unit which calculates the number of wait pixels based on the number of deletion lines and the number of extension lines.

5. The image processing apparatus according to claim 4, wherein
the image computing unit sequentially performs a first matrix process and a second matrix process, and
the wait line number calculation unit calculates the number of wait pixels based on the number of deletion lines of the first matrix process and the number of extension lines of the second matrix process.

6. The image processing apparatus according to claim 1, further comprising:
a central processing unit which outputs as a command the size of the plurality of pixels and the presence or absence of the edge process, wherein
the scheduling unit calculates the number of wait pixels based on the size of the plurality of pixels and the presence or absence of the edge process, outputted from the central processing unit.

7. The image processing apparatus according to claim 1, wherein
the size of the plurality of pixels are identical to a number of pixels that the number of pixels in the first direction and the number of pixels in the second direction are identical, and the number of pixels is a number of pixels in the first direction or in the second direction greater than 1.

8. The image processing apparatus according to claim 1, wherein
the image computing unit copies a pixel value of a pixel at an edge of an image frame, performs the edge process by performing the matrix process by using the copied pixel value, and does not perform the edge process by performing the matrix process without using the pixel value of the pixel at the edge of the image frame as a pixel value processed by the matrix process.

9. The image processing apparatus according to claim 1, further comprising:
a storage unit which stores the image data processed by image processing outputted from the image computing unit.

10. The image processing apparatus according to claim 1, further comprising:
an imaging unit that captures an image and generates the image data, wherein
the imaging unit outputs the image data to the image data input control unit.

11. The image processing apparatus according to claim 1, further comprising:
a communications unit which receives the image data transmitted by an external apparatus, wherein
the communications unit outputs the received image data to the image data input control unit.

12. An image processing method in an image processing apparatus for performing image processing on image data, the method comprising:
calculating a number of wait pixels between a first image frame and a second image frame in the image data based on a size of a plurality of pixels and a presence or absence of an edge process performing the matrix process by using a copied pixel value, by a scheduling unit, if an image computing unit performs image processing including matrix process performing a computation by using the pixel value of the plurality of pixels represented in a first direction and a second direction intersecting the first direction; and
outputting the image data of the first image frame to the image computing unit, delaying an output of the image data of the second image frame by the number of wait pixels, and outputting the image data of the second image frame to the image computing unit, by image data input control unit.

13. A scheduling apparatus to an image computing apparatus for performing to image data image processing including a matrix process performing a computation by using a pixel value of a plurality of pixels represented in a first direction and a second direction intersecting the first direction, the scheduling apparatus comprising;
a wait line number calculation unit which calculates a number of wait pixels between a first image frame and a second image frame in the image data based on a size of the plurality of pixels and a presence or absence of an edge process performing the matrix process by using a copied pixel value, wherein
the image data of the first image frame is outputted to the image computing apparatus, an output of the image data of the second image frame is delayed by the number of wait pixels, and the image data of the second image frame is outputted to image computing apparatus.

* * * * *